United States Patent
Fisher

(10) Patent No.: US 8,630,906 B2
(45) Date of Patent: Jan. 14, 2014

(54) SINGLE TAP TRANSACTIONS USING A POINT-OF-SALE TERMINAL

(71) Applicant: Blaze Mobile, Inc., Berkeley, CA (US)

(72) Inventor: Michelle Fisher, Oakland, CA (US)

(73) Assignee: Michelle Fisher, Oakland, CA (US)

( * ) Notice: Subject to any disclaimer, the term of this patent is extended or adjusted under 35 U.S.C. 154(b) by 0 days.

(21) Appl. No.: 13/680,627

(22) Filed: Nov. 19, 2012

(65) Prior Publication Data

US 2013/0073373 A1 Mar. 21, 2013

Related U.S. Application Data

(63) Continuation of application No. 13/338,203, filed on Dec. 27, 2011, now Pat. No. 8,332,272, which is a continuation of application No. 11/948,903, filed on (Continued)

(51) Int. Cl.
*G06Q 20/00* (2012.01)
*G07F 19/00* (2006.01)
*G06Q 40/00* (2012.01)
*G06K 15/00* (2006.01)
*G06Q 20/20* (2012.01)
*G07F 7/10* (2006.01)

(52) U.S. Cl.
CPC ............... *G06Q 20/20* (2013.01); *G06Q 40/10* (2013.01); *G07F 7/1008* (2013.01)
USPC ................... 705/16; 705/30; 705/40; 705/41; 705/44; 455/41.1; 455/558; 235/379; 235/380; 235/383

(58) Field of Classification Search
CPC ..... G06Q 20/20; G06Q 20/206; G06Q 40/10; G06Q 20/105; G06Q 20/40; G06Q 30/06; G07F 7/1008; G07F 7/08
USPC ................. 705/16, 18, 30, 40, 41, 44, 39, 67; 725/9, 23, 35; 235/380, 379, 383; 455/41.1, 558
See application file for complete search history.

(56) References Cited

U.S. PATENT DOCUMENTS 6,038,367 A 3/2000 Abecassis
6,101,483 A * 8/2000 Petrovich et al. ............... 705/21

(Continued)

FOREIGN PATENT DOCUMENTS

WO WO 2006095212 A1 9/2006
WO WO 2006095212 A1 * 9/2006 ............ H04M 11/00

OTHER PUBLICATIONS

Puri, V. (1997). Smart cards—the smart way for the banks to go? The International Journal of Bank Marketing, 15(4), 134-139. Retrieved from http://search.proquest.com/docview/231443728?accountid=14753.*

(Continued)

*Primary Examiner* — Matthew Gart
*Assistant Examiner* — Olusegun Goyea

(57) ABSTRACT

The invention describes how a consumer can hold their NFC enabled device in proximity to an NFC enabled point-of-sale terminal and with a single "wave" or "tap" to automatically redeem coupons, pay for a purchase using a default payment card or a selected card, view receipts view reward point balances, and receive relevant coupons and other digital artifacts both before and after the purchase. The NFC enabled device includes a secure element with a payment application, payment credentials, and other digital artifacts such as coupons. The secure element can be internal to the mobile device, externally affixed to the mobile device, or inserted into a slot within the body of the mobile device.

20 Claims, 17 Drawing Sheets

Related U.S. Application Data

Nov. 30, 2007, now Pat. No. 8,352,323, and a continuation of application No. 11/956,261, filed on Dec. 13, 2007, and a continuation of application No. 11/467,441, filed on Aug. 25, 2006, now abandoned, and a continuation of application No. 12/592,581, filed on Nov. 25, 2009, and a continuation of application No. 11/939,821, filed on Nov. 14, 2007, now Pat. No. 8,290,433, and a continuation of application No. 11/944,267, filed on Nov. 21, 2007, and a continuation of application No. 11/933,321, filed on Oct. 31, 2007, now Pat. No. 8,275,312, which is a continuation-in-part of application No. 11/467,441, filed on Aug. 25, 2006, now abandoned.

(56) References Cited

U.S. PATENT DOCUMENTS

| | | | |
|---|---|---|---|
| 6,115,601 A * | 9/2000 | Ferreira | 455/406 |
| 6,123,259 A * | 9/2000 | Ogasawara | 235/380 |
| 6,128,655 A | 10/2000 | Fields | |
| 6,141,666 A | 10/2000 | Tobin | |
| 6,199,082 B1 | 3/2001 | Ferrel | |
| 6,250,557 B1 * | 6/2001 | Forslund et al. | 235/492 |
| 6,415,156 B1 | 7/2002 | Stadelmann | |
| 6,450,407 B1 * | 9/2002 | Freeman et al. | 235/492 |
| 6,587,835 B1 * | 7/2003 | Treyz et al. | 705/14.64 |
| 6,605,120 B1 | 8/2003 | Fields | |
| 6,771,981 B1 | 8/2004 | Zalewski | |
| 6,772,396 B1 | 8/2004 | Cronin | |
| 6,886,017 B1 | 4/2005 | Jackson | |
| 6,950,939 B2 | 9/2005 | Tobin | |
| 7,031,945 B1 | 4/2006 | Donner | |
| 7,069,248 B2 | 6/2006 | Huber | |
| 7,096,003 B2 | 8/2006 | Joao | |
| 7,110,744 B2 | 9/2006 | Freeny | |
| 7,110,792 B2 * | 9/2006 | Rosenberg | 455/558 |
| 7,127,236 B2 | 10/2006 | Khan | |
| 7,188,089 B2 | 3/2007 | Goldthwaite | |
| 7,200,578 B2 * | 4/2007 | Paltenghe et al. | 705/74 |
| 7,289,810 B2 | 10/2007 | Jagadeesan | |
| 7,308,254 B1 | 12/2007 | Rissanen | |
| 7,512,567 B2 * | 3/2009 | Bemmel et al. | 705/67 |
| 7,522,905 B2 | 4/2009 | Hammad | |
| 7,784,684 B2 * | 8/2010 | Labrou et al. | 235/380 |
| 7,870,077 B2 * | 1/2011 | Woo et al. | 705/78 |
| 7,979,519 B2 * | 7/2011 | Shigeta et al. | 709/223 |
| 8,005,426 B2 * | 8/2011 | Huomo et al. | 455/41.2 |
| 8,016,192 B2 * | 9/2011 | Messerges et al. | 235/380 |
| 8,019,362 B2 * | 9/2011 | Sweatman et al. | 455/466 |
| 8,073,424 B2 * | 12/2011 | Sun et al. | 455/406 |
| 8,086,534 B2 * | 12/2011 | Powell | 705/44 |
| 8,109,444 B2 * | 2/2012 | Jain | 235/492 |
| 8,127,984 B2 * | 3/2012 | Zatloukal et al. | 235/380 |
| 8,214,454 B1 * | 7/2012 | Barnes et al. | 709/217 |
| 2001/0011250 A1 * | 8/2001 | Paltenghe et al. | 705/41 |
| 2001/0044751 A1 * | 11/2001 | Pugliese et al. | 705/26 |
| 2002/0056091 A1 * | 5/2002 | Bala et al. | 725/34 |
| 2002/0065774 A1 * | 5/2002 | Young et al. | 705/41 |
| 2002/0077918 A1 | 6/2002 | Lerner | |
| 2002/0082879 A1 | 6/2002 | Miller | |
| 2002/0107756 A1 | 8/2002 | Hammons | |
| 2002/0116269 A1 * | 8/2002 | Ishida | 705/14 |
| 2002/0160761 A1 * | 10/2002 | Wolfe | 455/414 |
| 2002/0169984 A1 | 11/2002 | Kumar | |
| 2003/0061113 A1 * | 3/2003 | Petrovich et al. | 705/26 |
| 2003/0065805 A1 | 4/2003 | Barnes | |
| 2003/0074259 A1 * | 4/2003 | Slyman et al. | 705/14 |
| 2003/0085286 A1 * | 5/2003 | Kelley et al. | 235/492 |
| 2003/0087601 A1 * | 5/2003 | Agam et al. | 455/39 |
| 2003/0093695 A1 | 5/2003 | Dutta | |
| 2003/0105641 A1 | 6/2003 | Lewis | |
| 2003/0132298 A1 * | 7/2003 | Swartz et al. | 235/472.02 |
| 2003/0163359 A1 * | 8/2003 | Kanesaka | 705/8 |
| 2003/0172028 A1 | 9/2003 | Abell | |
| 2004/0006497 A1 | 1/2004 | Nestor | |
| 2004/0030658 A1 | 2/2004 | Cruz | |
| 2004/0073497 A1 * | 4/2004 | Hayes et al. | 705/27 |
| 2004/0127256 A1 * | 7/2004 | Goldthwaite et al. | 455/558 |
| 2004/0235450 A1 * | 11/2004 | Rosenberg | 455/406 |
| 2004/0243519 A1 | 12/2004 | Perttila | |
| 2004/0254836 A1 * | 12/2004 | Emoke Barabas et al. | 705/14 |
| 2004/0267618 A1 | 12/2004 | Judicibus | |
| 2005/0040230 A1 * | 2/2005 | Swartz et al. | 235/383 |
| 2005/0076210 A1 | 4/2005 | Thomas | |
| 2005/0187873 A1 * | 8/2005 | Labrou et al. | 705/40 |
| 2005/0215231 A1 | 9/2005 | Bauchot | |
| 2006/0031752 A1 * | 2/2006 | Surloff et al. | 715/501.1 |
| 2006/0089874 A1 * | 4/2006 | Newman et al. | 705/14 |
| 2006/0143091 A1 * | 6/2006 | Yuan et al. | 705/26 |
| 2006/0191995 A1 * | 8/2006 | Stewart et al. | 235/379 |
| 2006/0206709 A1 * | 9/2006 | Labrou et al. | 713/167 |
| 2006/0219780 A1 * | 10/2006 | Swartz et al. | 235/383 |
| 2006/0287920 A1 * | 12/2006 | Perkins et al. | 705/14 |
| 2007/0011099 A1 * | 1/2007 | Sheehan | 705/65 |
| 2007/0022058 A1 * | 1/2007 | Labrou et al. | 705/67 |
| 2007/0095892 A1 | 5/2007 | Lyons | |
| 2007/0125838 A1 * | 6/2007 | Law et al. | 235/379 |
| 2007/0125840 A1 * | 6/2007 | Law et al. | 235/379 |
| 2007/0131759 A1 * | 6/2007 | Cox et al. | 235/380 |
| 2007/0138299 A1 * | 6/2007 | Mitra | 235/492 |
| 2007/0156436 A1 * | 7/2007 | Fisher et al. | 705/1 |
| 2007/0210155 A1 * | 9/2007 | Swartz et al. | 235/383 |
| 2007/0255662 A1 | 11/2007 | Tumminaro | |
| 2007/0270166 A1 * | 11/2007 | Hampel et al. | 455/456.3 |
| 2007/0293155 A1 * | 12/2007 | Liao et al. | 455/41.2 |
| 2008/0010196 A1 * | 1/2008 | Rackley, III et al. | 705/40 |
| 2008/0017704 A1 * | 1/2008 | VanDeburg et al. | 235/380 |
| 2008/0045172 A1 * | 2/2008 | Narayanaswami et al. | 455/187.1 |
| 2008/0048022 A1 * | 2/2008 | Vawter | 235/380 |
| 2008/0051059 A1 * | 2/2008 | Fisher | 455/410 |
| 2008/0051142 A1 * | 2/2008 | Calvet et al. | 455/558 |
| 2008/0052192 A1 * | 2/2008 | Fisher | 705/26 |
| 2008/0052233 A1 * | 2/2008 | Fisher et al. | 705/40 |
| 2008/0126260 A1 * | 5/2008 | Cox et al. | 705/67 |
| 2008/0139155 A1 | 6/2008 | Boireau | |
| 2008/0148040 A1 * | 6/2008 | Machani et al. | 713/150 |
| 2008/0167017 A1 * | 7/2008 | Wentker et al. | 455/414.1 |
| 2008/0167988 A1 * | 7/2008 | Sun et al. | 705/39 |
| 2008/0177668 A1 | 7/2008 | Delean | |
| 2008/0207234 A1 * | 8/2008 | Arthur et al. | 455/466 |
| 2008/0208681 A1 | 8/2008 | Hammad | |
| 2008/0208743 A1 * | 8/2008 | Arthur et al. | 705/41 |
| 2008/0208744 A1 * | 8/2008 | Arthur et al. | 705/41 |
| 2008/0208762 A1 * | 8/2008 | Arthur et al. | 705/79 |
| 2008/0221997 A1 * | 9/2008 | Wolfe | 705/14 |
| 2008/0255947 A1 * | 10/2008 | Friedman | 705/14 |
| 2008/0262928 A1 * | 10/2008 | Michaelis | 705/14 |
| 2008/0275779 A1 * | 11/2008 | Lakshminarayanan | 705/14 |
| 2008/0294556 A1 | 11/2008 | Anderson | |
| 2008/0305774 A1 | 12/2008 | Ramakrishna | |
| 2009/0063312 A1 * | 3/2009 | Hurst | 705/30 |
| 2009/0098825 A1 * | 4/2009 | Huomo et al. | 455/41.1 |
| 2009/0106112 A1 * | 4/2009 | Dalmia et al. | 705/14 |
| 2009/0124234 A1 * | 5/2009 | Fisher et al. | 455/406 |
| 2009/0132362 A1 * | 5/2009 | Fisher et al. | 705/14 |
| 2009/0143104 A1 * | 6/2009 | Loh et al. | 455/558 |
| 2009/0144161 A1 * | 6/2009 | Fisher | 705/16 |
| 2009/0177587 A1 * | 7/2009 | Siegal et al. | 705/67 |
| 2009/0227281 A1 * | 9/2009 | Hammad et al. | 455/550.1 |
| 2010/0057619 A1 * | 3/2010 | Weller et al. | 705/67 |
| 2010/0063895 A1 * | 3/2010 | Dominguez et al. | 705/26 |
| 2011/0320316 A1 * | 12/2011 | Randazza et al. | 705/26.43 |
| 2012/0030044 A1 * | 2/2012 | Hurst | 705/18 |
| 2013/0054470 A1 * | 2/2013 | Campos et al. | 705/67 |

OTHER PUBLICATIONS

STMicroelectronics extends contactless secure MCU family with 2-kbyte EEPROM version for cost-sensitive high-performance applications. (Oct. 28, 2004). PR Newswire. Retrieved from http://search.proquest.com/docview/451611936?accountid=14753.*

(56) References Cited

OTHER PUBLICATIONS

U.S. Appl. No. 11/933,337, Office Action mailed May 27, 2010, 9 p.
U.S. Appl. No. 11/933,351, Office Action mailed Oct. 3, 2008, 5 p.
U.S. Appl. No. 11/933,367, Office Action mailed May 27, 2010, 8 p.
U.S. Appl. No. 11/467,441, Office Action mailed May 27, 2009, 17 p.
U.S. Appl. No. 12/592,581, Office Action mailed Jun. 4, 2010, 20 p.
U.S. Appl. No. 11/933,351, Office Action mailed Jul. 8, 2009, 7 p.
U.S. Appl. No. 11/939,821, Office Action mailed Aug. 17, 2010, 11 p.
U.S. Appl. No. 11/933,351, Office Action mailed Aug. 18, 2010, 16 p.
U.S. Appl. No. 11/933,321, Office Action mailed May 27, 2010, 11 p.
U.S. Appl. No. 11/948,903, Office Action mailed Feb. 2, 2009, 11 p.
U.S. Appl. No. 11/948,903, Office Action mailed Nov. 12, 2009, 14 p.
Deena, M. Amato, "Mobile Rewards." Chain Store Age 82.5 (2006): 160, 161, 163. Hoover's Company Profiles; ProQuest Central. Web. Oct. 5, 2012.
"ViVOtech to Demonstrate Industry's First End-to-End Near Field Communication (NFC) Solution at the NRF Show." Business Wire: 1 Jan. 16, 2006. Business Dateline; Hoover's Company Profiles; ProQuest Central. Web. Oct. 5, 2012.
Marsh, David. "Get Smart." EDN 48.6 (2003): 61-8. Hoover's Company Profiles; ProQuest Central. Web. Oct. 5, 2012.

* cited by examiner

SINGLE TAP TRANSACTIONS USING A POINT-OF-SALE TERMINAL

CROSS REFERENCE TO RELATED APPLICATIONS/PRIORITY CLAIMS

This application is a continuation of and claims priority under 35 USC 120 to U.S. patent application Ser. No. 13/338,203, entitled "Single Tap Transactions Using an NFC Enabled Mobile Device", filed on Dec. 27, 2011, which is a continuation of and claims priority under 35 USC 120 to U.S. patent application Ser. No. 11/948,903, entitled "Method And System For Conducting An Online Payment Transaction Using A Mobile Communication Device", filed on Nov. 30, 2007; and is a continuation of and claims priority under 35 USC 120 to U.S. patent application Ser. No. 11/956,261, entitled, "Method and System for Delivering Customized Information To A Mobile Communication Device Based on User Affiliations", filed on Dec. 13, 2007; and is a continuation of and claims priority under 35 USC 120 to U.S. patent application Ser. No. 11/467,441, entitled "Method and Apparatus For Completing A Transaction Using A Wireless Mobile Communication Channel and Another Communication Channel", filed on Aug. 25, 2006; and is a continuation of and claims priority under 35 USC 120 to U.S. patent application Ser. No. 12/592,581, entitled "Method and Apparatus For Completing A Transaction Using A Wireless Mobile Communication Channel and Another Communication Channel", filed on Nov. 25, 2009; and is a continuation of and claims priority under 35 USC 120 to U.S. patent application Ser. No. 11/939,821, entitled "Method and System for Securing Transactions Made Through a Mobile Communication Device", filed on Nov. 14, 2007, now U.S. Pat. No. 8,290,433; and is a continuation of and claims priority under 35 USC 120 to U.S. patent application Ser. No. 11/944,267, entitled "Method And System For Delivering Information To A Mobile Communication Device Based On Consumer Transactions", filed on Nov. 21, 2007; and is a continuation of and claims priority under 35 USC 120 to U.S. patent application Ser. No. 11/933,321, entitled "Induction Triggered Transactions Using an External NFC Device", filed Oct. 31, 2007, now U.S. Pat. No. 8,275,312, which is a Continuation-in-part of and claims priority under 35 USC 120 to U.S. patent application Ser. No. 11/467,441, entitled "Method and Apparatus for Completing a Transaction Using A Wireless Mobile Communication Channel and Another Communication Channel", filed Aug. 25, 2006, now abandoned; the entirety of all of which are incorporated herein by reference.

FIELD OF THE INVENTION

The present invention relates to data communications and wireless devices.

BACKGROUND OF THE INVENTION

Mobile communication devices—e.g., cellular phones, personal digital assistants, and the like—are increasingly being used to conduct payment transactions as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel, both of which are incorporated herein by reference. Such payment transactions can include, for example, purchasing goods and/or services, bill payments, and transferring funds between bank accounts.

BRIEF SUMMARY OF THE INVENTION

In general, this specification describes a method and system for conducting an online payment transaction through a point of sale device. The method includes receiving input from a user selecting an item for purchase through the point of sale device; calculating a total purchase amount for the item in response to a request from the user to purchase the item; and sending payment authorization for the total purchase amount from the point of sale device to a payment entity, in which the payment authorization is sent to the payment entity via a mobile communication device of the user. The method further includes receiving a result of the payment authorization from the payment entity through the mobile communication device; and completing the payment transaction based on the result of the payment authorization.

Particular implementations can include one or more of the following features. The point of sale device can be a desktop computer, a laptop computer, or a terminal. The mobile communication device can be a cellular phone, a wireless personal digital assistant (PDA), or a laptop computer. The cellular phone can be an NFC-enabled phone. Sending payment authorization for the total purchase amount from the point of sale device to a payment entity can include sending the payment authorization securely to the payment entity. The payment entity can be a person, a computer system, or a bank. The method can further include maintaining a shopping list on the mobile communication device of the user, in which the shopping list includes a listing of one or more items to be purchased by the user. The payment authorization can be an authorization for payment with a credit card, a debit card, or a prepaid card.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
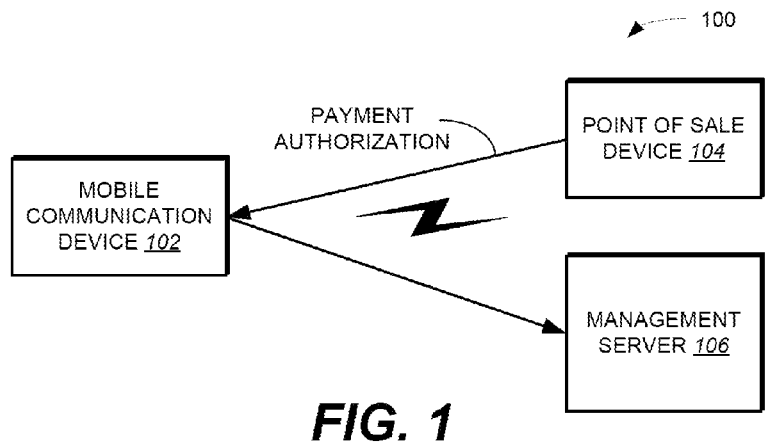
FIG. 1 illustrates a block diagram of a communication system including a wireless mobile communication device and a management server in accordance with one implementation.

FIG. 1 illustrates one implementation of a communication system 100. The communication system 100 includes a handheld, wireless mobile communication device 102 a point-of-sale device 104 and a management server 106. In one implementation, the mobile communication device 102 includes a mobile application (discussed in greater detail below) that permits a user of the mobile communication device 102 to conduct payment transactions. Payment transactions can include, for example, using contactless payment technology at a retail merchant point of sale (e.g., through point of sale device 104), using mobile/internet commerce (e.g., purchase tickets and products, etc.), storage of payment information and other digital artifacts (e.g., receipts, tickets, coupons, etc.), storage of banking information (payment account numbers, security codes, PIN's, etc.), and accessing banking service (account balance, payment history, bill pay, fund transfer, etc.), and so on. The mobile communication device 102 can be a cellular phone, a wireless personal digital assistant (PDA), a laptop computer, or other wireless communication device. The point of sale device 104 can be a desktop computer, laptop computer, terminal, or other device that is configured to receive user input selecting items for purchase or other transaction.

In one implementation, authorizations for payment transactions that are made through the point of sale device 104 are sent from the point of sale device 104 to an issuer authorization (e.g., management server 106) through the mobile communication device 102 (as shown in FIG. 1). In one implementation, an issuer authorization is a payment entity that either approves or disapproves a payment transaction. An issuer authorization can be, e.g., a person, computer system, bank (or other third party). One potential benefit of having payment authorizations flow through the mobile communication device 102 is that sensitive user information (e.g. account numbers, pin numbers, and/or identity information) need only be sent from the mobile communication device 102 directly to an issuer authorization. Such operation reduces the potential for identity theft and/or fraudulent purchases made through a point of sale device. For example, (in one implementation) payment authorizations cannot be sent to an issuer authorization if the mobile communication device 102 is turned off.

Figure 2:
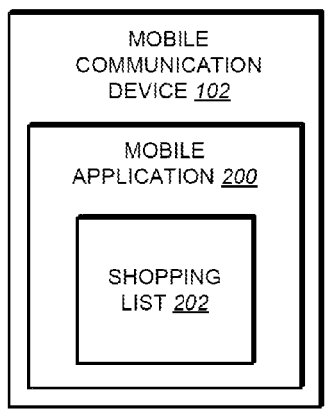
FIG. 2 illustrates one implementation of the wireless mobile communication device of FIG. 1.

FIG. 2 illustrates one implementation of the mobile communication device 102. The mobile communication device 102 includes a mobile application 200 that (in one implementation) is provided to the mobile communication device 102 through a remote server (e.g., management server 106). In one implementation, the mobile application is a Mobile Wallet application available from Mobile Candy Dish, Inc., of Alameda, Calif. In one implementation, the mobile application is a hosted service, as described in U.S. patent application Ser. No. 11/939,821, entitled "Method and System For Securing Transactions Made Through a Mobile Communication Device", which is incorporated herein by reference. In one implementation, the mobile application 200 is configured to send requests to the management server for artifacts based on user input, e.g., received though a keypad (not shown) of the mobile communication device 102. Requests to the management server 106 can also be automated, via proximity-based services, e.g., consumer tapping (or in close proximity) an LBS/contactless/RFID enabled phone against a smart poster (RFID/Bluetooth/LBS enabled, etc.), kiosk, or other device.

In one implementation, the mobile application 200 running on the mobile communication device 102 is configured to receive artifacts (e.g., advertisements, receipts, tickets, coupons, media, content, and so on) from the management server 106. In one implementation, the management server 106 sends artifacts to the mobile application based on user profile information and/or a transaction history (or payment trends) associated with a user of the mobile communication device 102 as described in U.S. patent application Ser. No. 11/944, 267, entitled "Method and System For Delivering Information To a Mobile Communication Device Based On Consumer Transactions", which is incorporated herein by reference.

In one implementation, the mobile communication device 102 is an NFC-enabled phone. The mobile communication device 102 can be NFC-enabled, for example, through an embedded chip or a sticker that is affixed to the cellular phone, as described in U.S. application Ser. No. 11/933,321, entitled "Method and System For Adapting a Wireless Mobile Communication Device For Wireless Transactions", which is incorporated herein by reference. In one implementation, the NFC chip (or sticker) on the cellular phone can be used in conjunction with a merchant's point of sale device as described in greater detail below.

Figure 4:
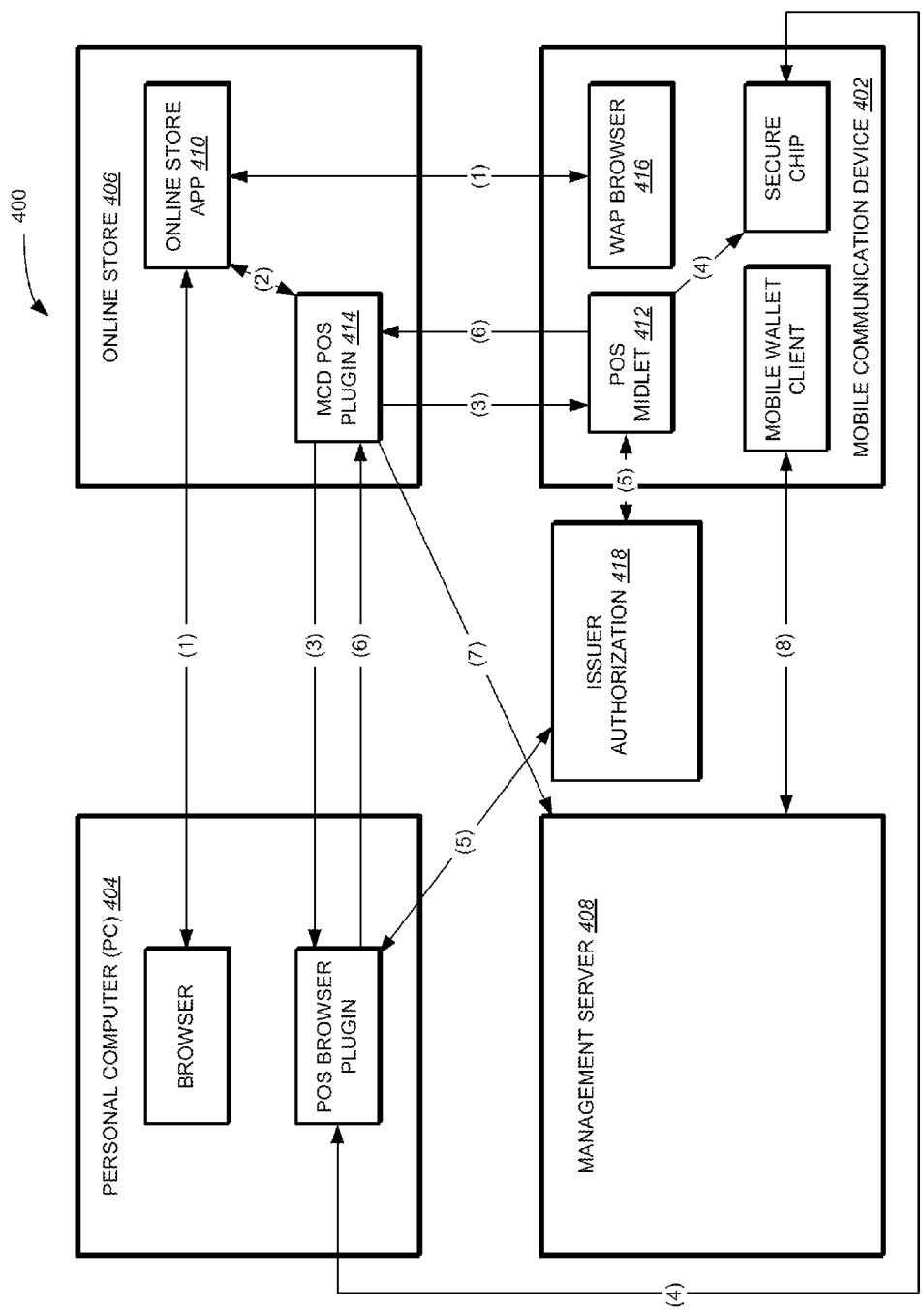
FIG. 4 illustrates a block diagram of a communication system including a wireless mobile communication device and an online store in accordance with one implementation.

For example, with reference to FIG. 4, in one implementation, the NFC chip (or sticker) on the cellular phone can communicate with NFC chips that are installed on the front of PC's (TV's, Kiosks, or any other device) and serve as scanners/readers. In this implementation a mobile candy dish applet (e.g., MCD POS plugin 414) is installed on the consumer's computer (e.g., PC 404) which interfaces with the NFC chip on the PC. When a consumer (or user) is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then waves their phone over the NFC reader present on the PC 404. The consumer's payment credentials are transferred from the phone to the merchant website (e.g., online store application 410) using a communication protocol between the chip in the phone and the chip in the PC, which can be radio frequency for example. If the consumer has coupons in their mobile wallet the consumer can either elect to manually apply the coupon, save the coupon for a future use (against a larger purchase for example), or have the coupon automatically applied during the transaction and the transaction amount is updated. After the consumer enters any necessary validation information (e.g., pin) to provide a multi-factor authentication and confirms the transaction, the online purchase is processed as normal by the merchant's online processor. The mobile wallet can retrieve transaction data, account balance from the management server 408.

In one implementation, the mobile communication device 102 is a non NFC-enabled phone. In this implementation, the consumer connects his phone to the PC 404 via some non radio frequency method (e.g., IR, Bluetooth, USB cable, etc.). When a consumer is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then pushes, e.g., a "Buy now" button and the consumer's payment credentials are transferred from the phone to the merchant website (e.g., online store application 410) using the protocol between the phone and the PC 404 which can be radio frequency, for example. If the consumer has coupons in their mobile wallet the consumer can either elect to manually apply the coupon, save the coupon for a future use, or have the coupon automatically applied during the transaction and the transaction amount is updated. After the consumer enters any necessary validation information (e.g., pin) to provide multi-factor authentication and confirms the transaction, the online purchase is processed as normal by the merchant's online processor. The mobile wallet can retrieve transaction data and account balance from the management server 408.

In one implementation, the management server 408 and merchant portal (e.g., online store 408) are maintained by trusted parties and use an encrypted tunnel to transfer financial data. When the consumer is ready to pay for their online product, they enter their cell phone number on the merchant portal. The merchant portal (which has an MCD applet (e.g., MCD POS plugin 414) installed on its server) securely connects to the management server 408 (that in one implemetation is maintained by Mobile Candy Dish (MCD)). In one implementation, the management server 408 identifies the consumer through their cell phone number, and verifies the consumer's authenticity by sending a unique transaction code to the consumer mobile wallet on their cell phone. The consumer then enters this unique transaction code onto the merchant's web portal. The merchant portal sends this transaction number to the management server 408 for authentication. Upon authentication, the consumer's virtual wallet and payment methods (e.g., credit card, debit card, prepaid card, etc.) are securely retrieved from the management server 408 and are displayed to the consumer in a window on a website associated with the merchant portal. The consumer selects one of these payment methods to pay for their transaction. If a default card has been selected already, this step is not necessary. If the consumer has coupons in their mobile wallet the consumer can either elect to manually apply the coupon, save the coupon for a future use, or have the coupon automatically applied during the transaction and the transaction amount is updated. After the consumer enters any necessary validation information to provide a multi-factor authentication and confirms the transaction, the online purchase is processed as normal by the merchant's online processor. The mobile wallet can retrieve transaction data, account balance from the management server 408.

Referring to FIG. 2, in one implementation, the mobile application 200 maintains a shopping list 202 for a consumer. Accordingly, consumers have the ability to store their shopping list in their mobile wallet and add, delete, or change items on their shopping list either in offline or online mode. In one implementation, consumers are sent coupons based on items on their shopping list, preferences, previous shopping history, proximity to the physical retail store, or a combination of these parameters, as discussed in application Ser. No. 11/944,267, which is incorporated by reference above. If the consumer has coupons in their mobile wallet the consumer can either elect to manually apply the coupon, save the coupon for a future use, or have the coupon automatically applied during the transaction and the transaction amount is updated. When a consumer wants to order the items on their shopping list via an on online merchant (in contrast to a physical retail store), the consumer can logon to the merchant portal and electronically transmit their shopping list to the merchant portal either by waving their phone over NFC enabled PC's or some other connection such as IR, bluetooth, USB, or the like.

Figure 3:
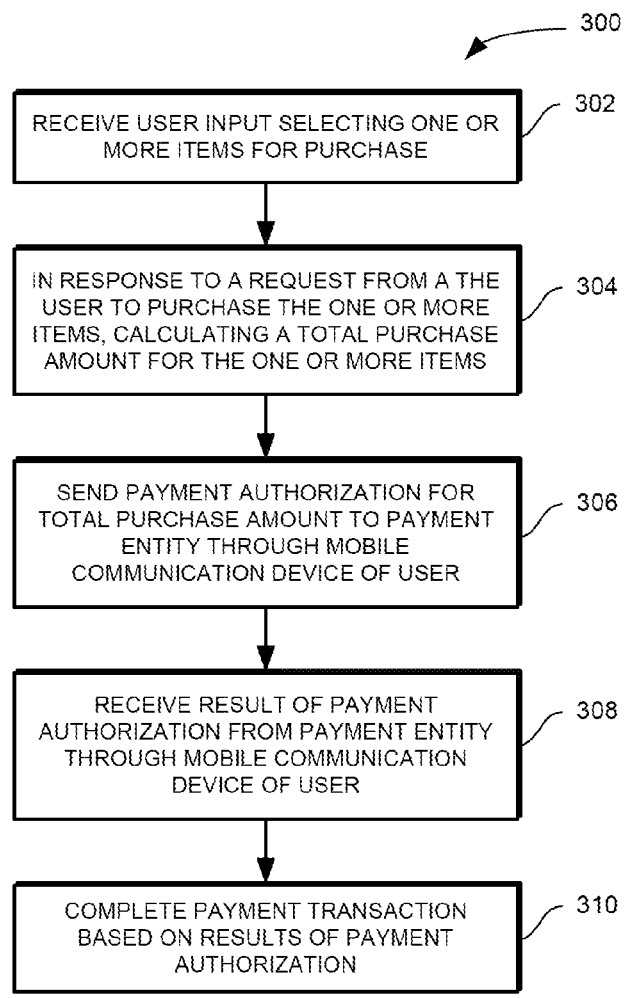
FIG. 3 is a method for conducting a payment transaction using a point of sale device in accordance with one implementation.

FIG. 3 illustrates a method 300 for conducting a payment transaction using a point of sale device (e.g., point of sale device 104). User input is received selecting one or more items for purchase (e.g., at the point of sale device) (step 302). In general, the transaction being made at the point of sale device can be any type of transaction that involves the exchange or transfer of funds—e.g., the transaction can be a payment transaction, a fund transfer, or other type of transaction. In response to a request from the user to purchase the one or more items, a total purchase amount for the one or more items is calculated (e.g., by the point of sale device) (step 304). If the user has coupons in their mobile wallet the user can either manually apply the coupon or have the coupon automatically applied during the transaction and the transaction amount is updated. The user request to purchase an item can be received, e.g., by a user clicking on a "buy now" icon that is displayed on a graphical user interface of the point of sale device. Payment authorization for the total purchase amount is sent to a payment entity through a mobile communication device of the user (step 306). A result of the payment authorization is received at the point of sale device from the payment entity via the mobile communication device (step 308). The payment transaction is completed based on the result of the payment authorization (step 310). If the payment transaction was authorized by the payment entity, then the sale of the items through the point of sale device is completed. Otherwise, if the payment transaction was not authorized by the payment entity, then the point of sale device terminates the payment transaction.

FIG. 4 illustrates an example payment transaction being made in a communication system 400 in accordance with one implementation. The communication system 400 includes a mobile communication device 402, a personal computer (PC) 404, an online store 406, and a core (or datastore) 408. As indicated by interaction (1), a user (or customer), using a phone (e.g., mobile communication device 402 or personal computer 404), browses an online store website (online store application 410) and finds an item that the customer wishes to purchase. This could also be a purchase made through a midlet application (POS midlet 412) residing on the mobile communication device 402. The user then goes to, e.g., a checkout of the online store 406 make a purchase. If the user has coupons in their mobile wallet the user can either manually apply the coupon or have the coupon automatically applied during the transaction and the transaction amount is updated. When it comes time to authorize the purchase, (in one implementation) the user is given an option to purchase with the mobile communication device 402. In one implementation, the mobile communication device 402 is an NFC-equipped phone (or NFC phone).

In interaction (2), when the user chooses to purchase with the mobile communication device 402, the online store application 410 sends the transaction information for authorization to the POS vendor plugin (e.g., MCD POS plugin 414). In one implementation, the POS vendor plugin is installed in the merchant's online store and enables the merchant to accepts MCD Blaze payments as an alternative form of payment, similar to accepting credit cards for payment. As shown by interaction (3), the POS vendor plugin formats, encrypts, and cryptographically signs the purchase authorization request which is sent via a secure SSL link (e.g., HTTPS, Bluetooth, IR, USB, or other suitable protocol) established by the browser/web application 416 back to the mobile communication device 402. As with the first scenario, all communications is over secure channels. (It may be required that the mobile wallet application be opened prior to beginning a phone online purchase.) The POS midlet 412 is a component of the mobile wallet application that executes PayPass or other payment authorization protocol between itself and the SE payment applications on the mobile communication device 402 (interaction (4)). The results of the request are sent back to the POS vendor plugin.

As shown by interaction (5), the POS midlet 412 then forwards the properly formatted authorization request to a payment entity (e.g., issuer authorization 418) for authorization. The results of the request are then sent back to the POS component of the mobile wallet. Through interaction (6), the POS midlet 412 then forwards the results back to the MCD POS plugin 414 to complete the purchase. The MCD POS plugin 414 then forwards the purchase transaction information to the management server 408 for later customer viewing (interaction (7)). As indicated by interaction (8), users (or customers) will then be able to query the management server 408 and immediately obtain purchase information, either by phone or PC.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 5:
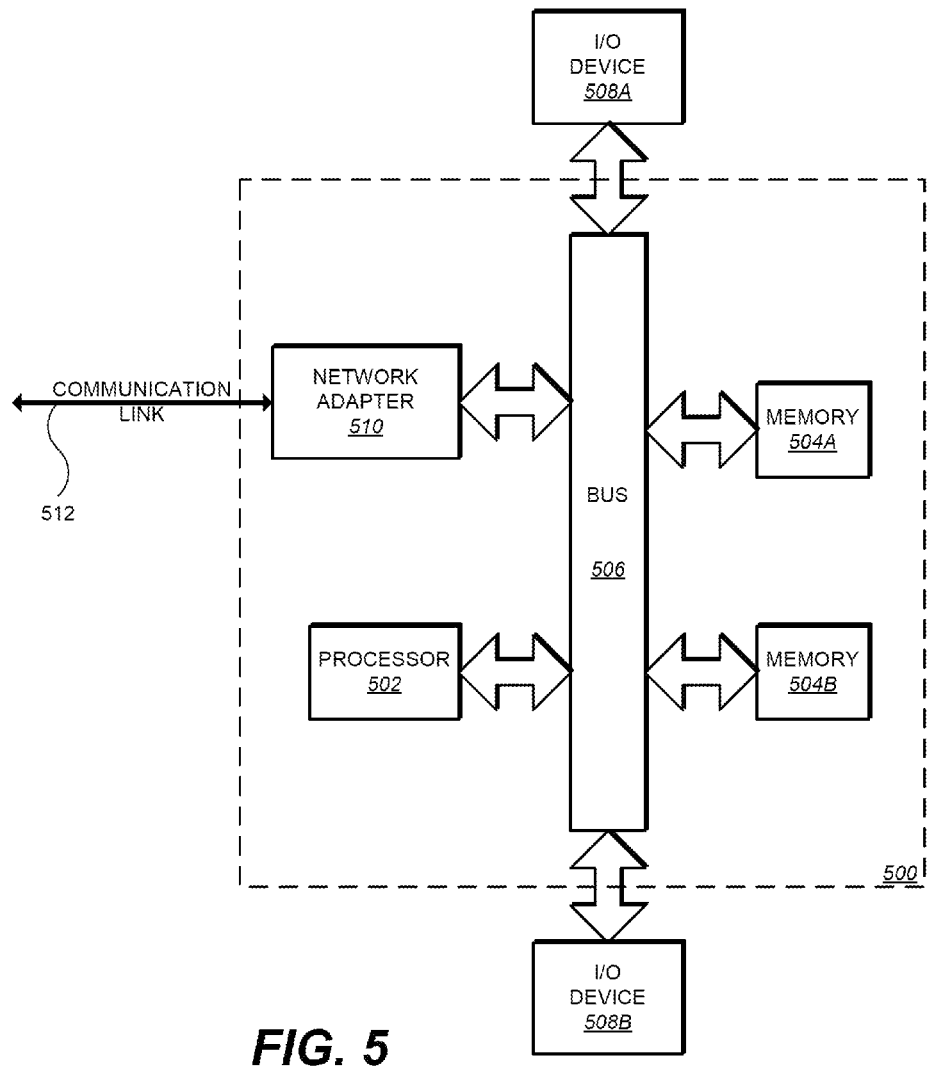
FIG. 5 is a block diagram of a data processing system suitable for storing and/or executing program code in accordance with one implementation.

FIG. 5 illustrates a data processing system 500 suitable for storing and/or executing program code. Data processing system 500 includes a processor 502 coupled to memory elements 504A-B through a system bus 506. In other implementations, data processing system 500 may include more than one processor and each processor may be coupled directly or indirectly to one or more memory elements through a system bus. Memory elements 504A-B can include local memory employed during actual execution of the program code, bulk storage, and cache memories that provide temporary storage of at least some program code in order to reduce the number of times the code must be retrieved from bulk storage during execution. As shown, input/output or I/O devices 508A-B (including, but not limited to, keyboards, displays, pointing devices, etc.) are coupled to data processing system 500. I/O devices 508A-B may be coupled to data processing system 500 directly or indirectly through intervening I/O controllers (not shown).

In one implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

The wireless mobile devices also include a near field communication (NFC) device, coupled with some type of transaction device having a code, such as a smart card that uses an RFID for identification purposes, allow for debit cards to securely make a simple transaction, such as purchasing a bus ticket, by simply waving the wireless mobile device near a reader installed on the bus, so that the bus fare is deducted from a total amount that is available stored on the smart card of the wireless mobile device, or by forwarding the fare to a server that can identify the identification code of the particular RFID and then subsequently charge the user. The system and method allow the user to complete a transaction using a wireless mobile communication channel and another communication channel, particularly another communication channel that provides for near field radio channels (NFC), as well as other communication channels, such as Bluetooth or WIFI. The system may have a hand-held mobile device that wirelessly communicates between a secure element and a radio element that are associated with the hand-held mobile device. The system also has a hand-held mobile device that has a secure element that is insertable into a body of the hand-held mobile device, to thereby allow for wired communication between the secure element and a radio element of the hand-held mobile device.

Figure 6:
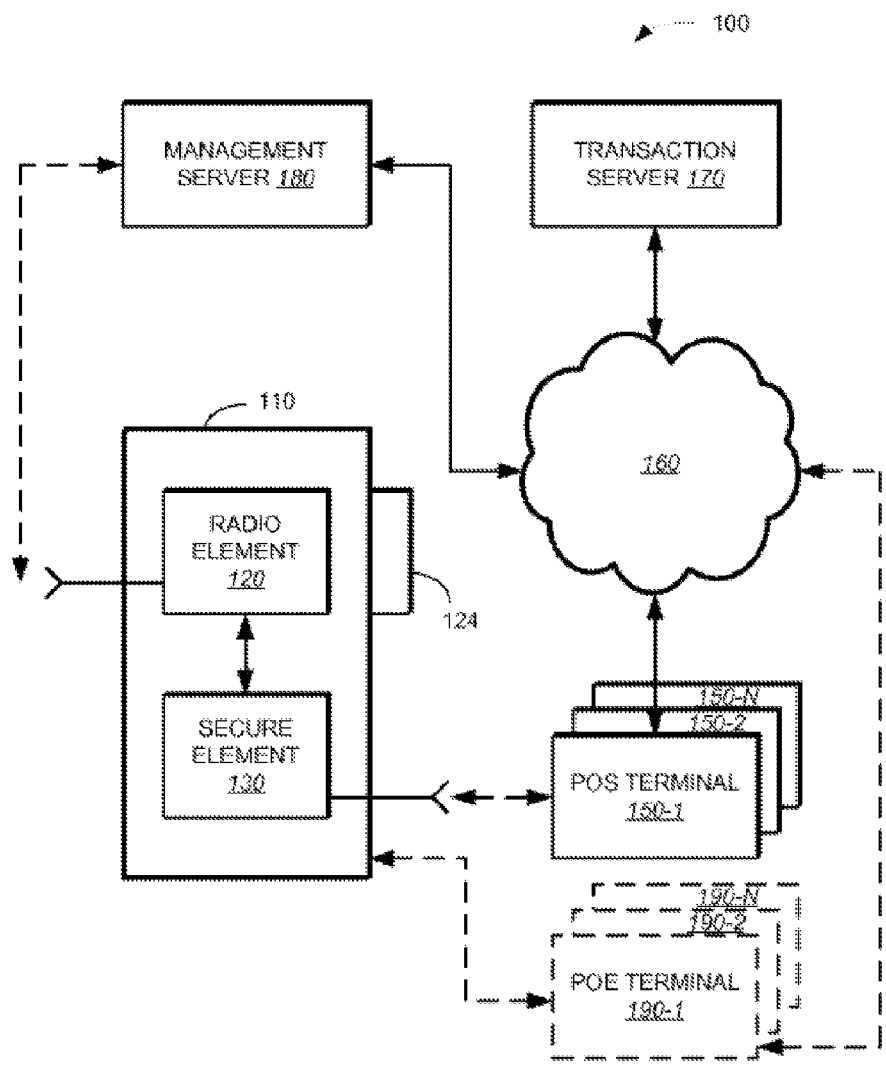
FIG. 6 illustrates another implementation of the communication system including a wireless mobile communication device and a management server in accordance with one implementation.

FIG. 6 illustrates another implementation of the communication system including a wireless mobile communication device and a management server in accordance with one implementation. One feature of the system 100 is the hand-held mobile device 110. The mobile device 100 includes a radio element 120 and a secure element 130. A display 124 is shown associated with the radio element 120, and antennas, not labeled, are shown as associated with each of the radio element 120 and the secure element 130, although it is noted that the illustration of antenna can physically be implemented in a manner that is different from the wireless antenna shown, such as by a stripe is passed along a reader, or some other transmission mechanism. Although elements 120 and 130 are shown as distinct and separate, and display 124 is shown as connected to the radio element 120, it will be understood that other configurations are within the scope of the invention, in particular, a combination in which a single processor is used to execute the functions that are currently performed and described herein as being provided by both the radio element 120 and the secure element 130, as described further herein. Further as illustrated in FIG. 6. both the radio element 120 and the secure element 130 are internal to the mobile device 110 as illustrated, although in certain embodiments the secure element 130 can be external to the mobile device 110, as described hereinafter. Also, various different functionalities can be included within the radio element 120 and the secure element 130, as also described hereinafter.

The point-of-sale terminal 150 receives one of the transaction request signals from the mobile device 110 and transmits the one transaction request signal to the transaction server 170, typically using a communication channel 160 such as the internet. The transaction server 170 that receives the one transaction request signal from the point-of-sale terminal 150 verifies the transaction, and forwards a transaction verification signal to the management server 180. The management server 180 that receives the transaction verification signal, identifies the user corresponding thereto, and provides as one of the transaction signals, a first transaction response signal back to the mobile device 110.

In one implementation, application programs running on the radio processor 123 are, e.g., BREW or J2ME applications and can encompass a broad array of application types. For example, current applications include games, enterprise applications, and multimedia applications. In one implementation, the radio processor 123 runs an application that provides movie and event information. Such an application can comprise ticketing applications, content, item and service purchase applications, and/or payment management applications (referred to herein also as "wallet applications"). In one implementation, the radio processor 123 also has the capability of recognizing secure communications, and transmits data which must be stored in a secure environment to the secure element driver 128 for transmission to the secure element 130. In one implementation, in which both the radio element 120 and the secure element 130 are internal to the mobile communication device 110, transmissions to the secure element 130 can take place using an internal wired communication channel. In one implementation, the radio processor 123 also has the capability of receiving data from the secure element 130, e.g., using the internal wired communication channel. In one implementation, the secure element 130 and the radio element 120 communicate using signals described in the Java Card 2.1 Platform API Specification.

Figure 8:
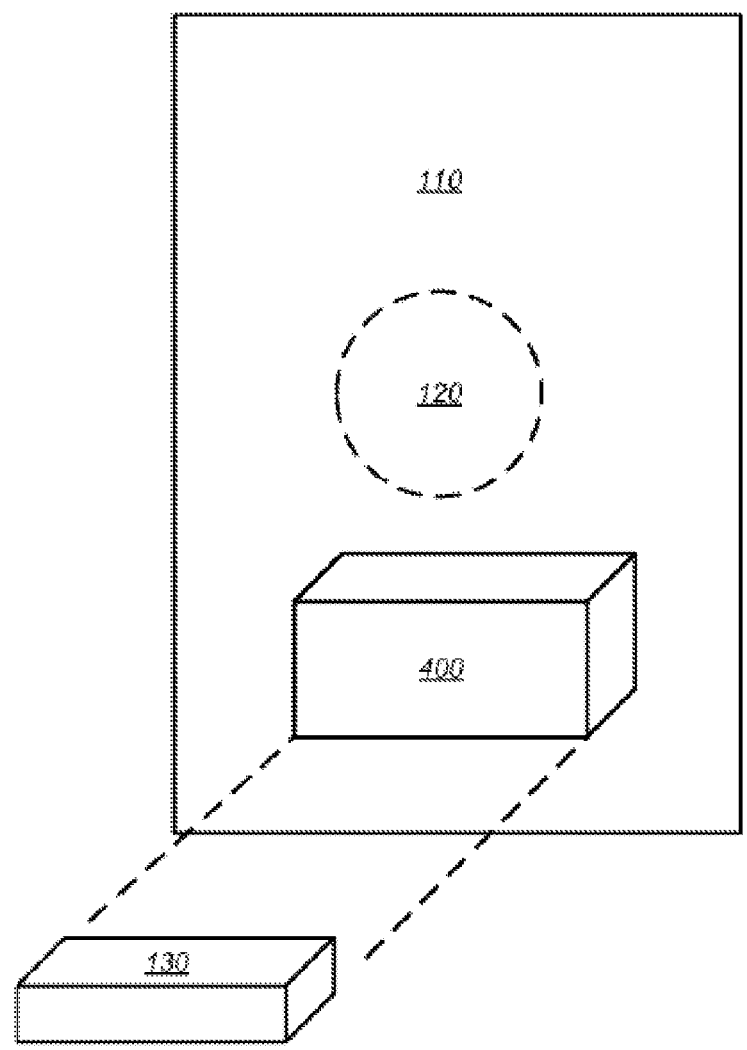
FIG. 8 illustrates one implementation of the wireless mobile communications device.

In one implementation, both the radio element 120 and the secure element 130 are disposed internally within a body of the mobile communication device 110. For example, referring to FIG. 8, the mobile communication device 110 is shown including a slot 400, which allows for the insertion of a secure element 130 into the slot 400. In this configuration, the secure element 130 can be purchased independently of the mobile communication device 110. The secure element 130 can also be disposed into a slot that only provides for physical insertion and mechanical connection to the body of the mobile communication device 110. In such an implementation, the secure element can include a transceiver that allows for the communication with the radio element 130 through a wireless local communication channel. The radio element 120 also is illustrated as optionally including another transceiver 129, such as a Bluetooth or WIFI transceiver, which can transmit and receive signals with an external device and then communicate signals to and from the radio processor 123. This additional communication channel allows for communications between other external devices, such as an external Bluetooth enabled smartcard, and provides an additional communication channel that is useful for certain transactions, as described further herein.

Figure 9A:
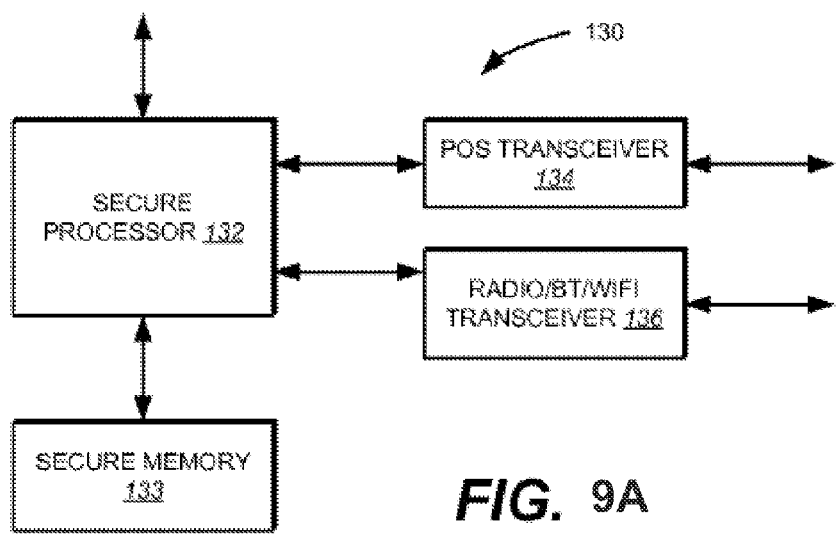
FIGS. 9A-9C respectively illustrate an implementation of a secure element in the wireless mobile communications device of FIG. 1.

FIG. 9A illustrates one implementation of the secure element 130 associated with the mobile communication device 110. The secure element 130 can be a smart card. In one implementation, the secure element 130 includes a secure processor 132, a secure memory 133, and a POS transceiver 134 adapted to send transaction request signals and receive transaction response signals over a first communication channel. In one implementation, the secure processor 132 communicates via the secure element driver 128 with the radio processor 123 using signals as described in the Java Card 2.1 Platform API Specification. The transaction request signals and the transaction response signals associated with the transaction can include an identification code associated with the user, as well as information relative to the transaction, such as item, quantity, vendor, and so on. In one implementation, the POS transceiver 134 is an NFC device, which uses an NFC modem. The POS transceiver 134 can also be a Bluetooth, WIFI or other transceiver. In an implementation in which the POS transceiver is an NFC modem, such an NFC modem will typically have a set of registers that can be read/written by the secure processor 132. These registers are in turn available for reading and writing over the RFID communications channel and serve as a shared memory between the secure processor 123 within the secure element 130 and the RFID reader that is associated with the POS terminal 150. This communication is specified, for example, in the ISO 14443A/B standard. The secure element can optionally include a radio/Bluetooth/WIFI transceiver 136, which can communicate with other devices, such as a transceiver associated with the radio processor 120 or for other external devices having those communication capabilities, thus allowing for more flexibility.

Figure 7:
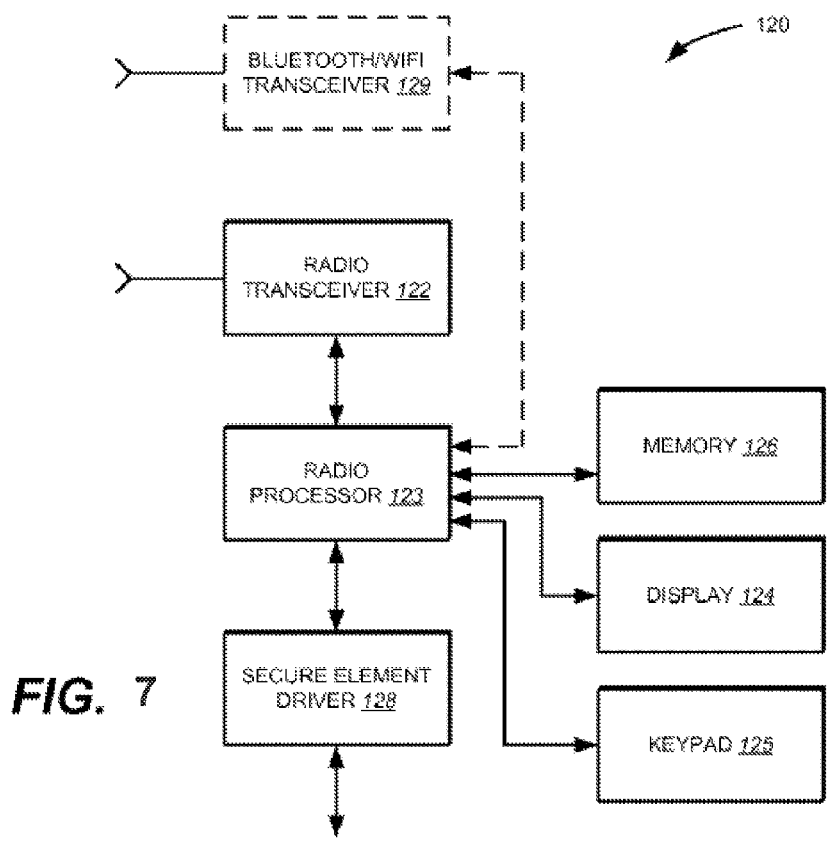
FIG. 7 illustrates an implementation of the radio element of the device in FIG. 6.
Figure 9B:
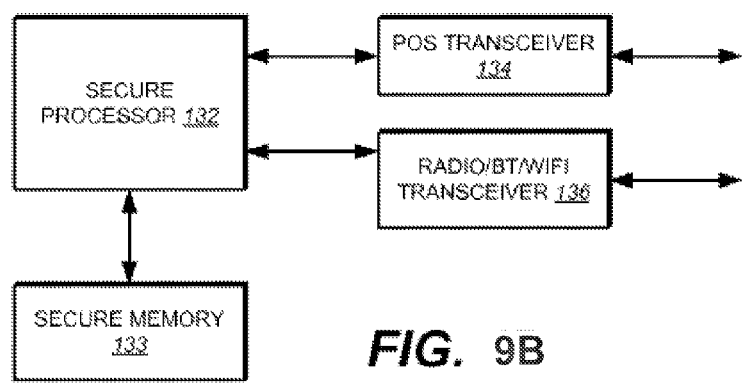

FIG. 9B shows another implementation of a secure element 130, in which the radio element 120 does not communicate with the secure element 130 through a secure element driver 128. In this case, for example, the secure element 130 may be external to the mobile communication device 110 and as such is not connected to the radio element through the secure element driver 128. In such an implementation, however, if the transceiver 136 as described above is included, and a similar transceiver 129 associated with the radio element 130 as described previously with respect to FIG. 7 is included, then this communication channel can be used to wirelessly obtain direct communications between the radio element 120 and the secure element 130. This implementation allows for certain bidirectional communications with other devices, as well as with the radio element 120, and as such more functionality and flexibility is achieved. This implementation is particularly useful since it establishes a direct local communication path with the radio element 120, since there is not communications with the radio element 120 via the path of driver 128.

Figure 12:
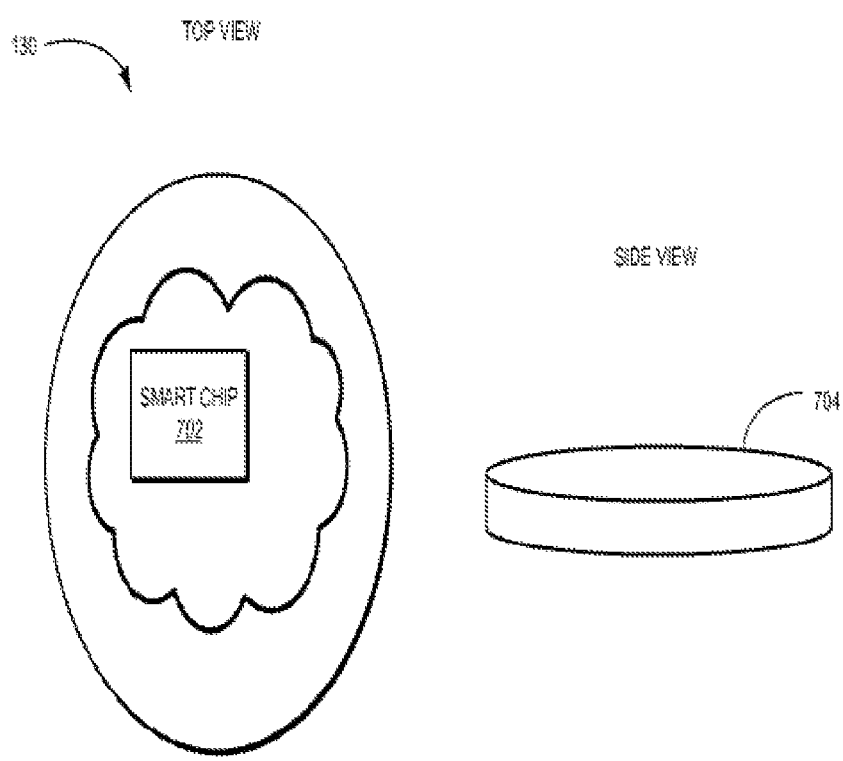
FIG. 12 illustrates one implementation of a secure element that is attachable to a wireless communications device.

FIG. 12 illustrates one implementation of a secure element 130 that can be attached (or affixed) externally to a wireless communication device (e.g., mobile communication device 110). In one implementation, the secure element 130 has circular shape. The secure element 130 can have other suitable shapes—e.g., rectangular, triangular, and so on. In one implementation, the secure element 130 includes an embedded smart chip 702 that is capable of executing proximity services (e.g., services related to payments, ticketing, identification, sending coupons, etc.). In one implementation, the smart chip 702 is capable of 2-way wireless communication (e.g., RFID, NFC, Bluetooth, etc.) with a supporting 3rdParty terminal. In one implementation, the 2-way communication is performed using a communication protocol that is different from a communication protocol through which the mobile communication device sends or receives voice and/or data signals. Multiple application protocols (NFC, MiFare, etc.) can be supported. In one implementation, the smart chip 702 is programmable. Accordingly, different application (for payments, ticketing, identification, coupons, etc.) can be developed, downloaded to the smart chip, and commissioned. Thus in operation, in response to the secure element 130 being placed in close proximity with a suitable terminal, the terminal will trigger (via application protocol) an appropriate application stored in the smart chip, and the smart chip will respond appropriately with the terminal.

In one implementation, the mobile application 910 provides banking and money management service, which includes (but is not limited to):

- Registration: User creates new MW Lite account with PIN (PIN and user info can be stored in user/profile database 306)
- Security & Encryption: Sensitive information may optionally by encrypted using 3rdParty or native phone tools (Bouncy Castle, etc.). Encryption (Public/Private) keys may be managed or proxy'd by Server which may additionally be out-sourced to 3rdparty Key Management vendor.
- Install & Configuration (I&C): Refers to setting up proxies to
  - payment accounts (virtual, credit, debit & banking)
  - Payees (BillPay, PayAnyone, etc.) and associated rules
  - Specify default payment account to debit fund transfers/unloading
  - Specify default payment account to credit fund transfers/loading
  - Activation of 3rdParty Services (Account Balance, Bill Pay, Fund Transfer, Funds Loading, Funds Unloading)
  - It is assumed Client application is pre-installed or downloaded to mobile device.
  - I&C to be performed via Kiosk, ATM, 3rdParty/Carrier Web Portal, MCD Web Portal, on mobile device, or other suitable device.
- Loading Funds
- Banking or financial data
  - Account balance
  - Transaction history
  - Bill Pay—Biller Direct
  - Fund Transfer—Intra Bank; Me-2-Me
  - Fund Transfer—Inter Bank; Me-2-Me
  - Fund Transfer—Inter Bank; Me-2-You (based on Bank Routing/Account#)
  - Fund Transfer—Inter Bank; Me-2-You (based on WalletID)
  - Fund Transfer—Inter Bank; Me-2-You (based on ACH Check). A.k.a. Bill Pay Anyone
  - Load Fund
- Unload Funds (ATM Withdrawal, etc.)
- Sync: Ensures server-side objects are downloaded to client and locally cached. This includes payment accounts, payees, payment rules, server-side cached account info (account balance, Last-N transaction history), etc.
  - This info will be cached on Client.
  - Users can create transaction either in ONLINE or OFFLINE (no network connectivity) mode
- Initiating/Triggering Banking Services:
- Storage: Storage of Users MWLite info, User's payment account info (credentials, account balance, history, etc.); Banking Payment History (BillPay, Fund Transfer, Fund Loads, Fund Unloads, etc.) Scenarios/Features In one implementation, a mobile communication device creates task/objects either while connected with a Server (online-mode) or when no connection is available (offline-mode). Tasks/objects are specific to mobile banking service and include for example: schedule (or cancel) a fund transfer transaction, schedule (or cancel) a bill pay transaction, and manage other banking transactions. In addition, digital artifacts (coupons, tickets, etc.) that possess a state (or status) (e.g., Assigned, Saves, Redeemed, Deleted, etc.) can undergo changes on the mobile communication device. Given these tasks/objects associated to Banking Services and Digital Artifacts has 'states' that can be changed in either an online-mode or offline-mode, the Server has to be refreshed/updated either in real-time (online-mode) or in batch (offline-mode).

Using the client (or mobile application), a user can store digital artifacts (e.g., coupons, tickets, etc.) on a mobile communication device. These digital artifacts are objects that are consumed by a 3rdParty, e.g., a ticket can be redeemed at a theater, and a coupon can be redeemed at the Point-Of-Sale of a retail merchant. Hence, this is a 3-way sync: 1) mobile communication device with server, 2. mobile communication device with 3rdParty Merchant, and 3) server with 3rdParty Merchant. For user's convenience, redemption of digital artifacts by a 3rdParty must be enabled in an environment with or without network access. For example, a user with an electronic ticket on a mobile communication device may wish to redeem an eTicket at a theater. However, if there is no network access inside the theater, the user will still need access the eTicket on the client. In ONLINE mode, the client will cache (local store) the eTicket (and any other digital artifact.) In the theater, the client (in OFFLINE mode) will be able to redeem the eTicket and update the state of the eTicket on the mobile communication device (e.g., change state from 'valid' to 'redeemed'). This prevents the user from re-using the eTicket. At some point when the mobile communication device re-acquires network connectivity, the client will then negotiate with the server and any artifacts with a state change (e.g., 'valid' to 'redeemed', etc.) on the client are then uploaded to the server (e.g., either in batch mode or one task at a time).

Figures 9C, 10:
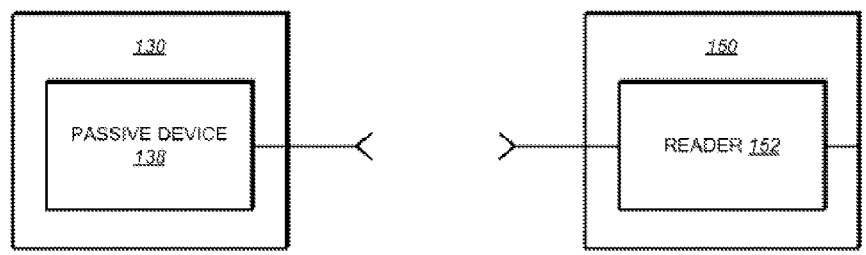
FIG. 10 illustrates one implementation of a point of sale terminal.

The point of sale terminal 150 illustrated in FIG. 10 is conventional, in that it has the capability of electronically reading information from a device equipped to transmit information in a format that it reads. Thus, the reader 152 within the point of sale terminal 150 can be of one or many types. If the point of sale terminal reader 152 includes the provision for NFC communications, then simply bringing the secure element 130 with the NFC transceiver will cause initiation of a transaction and the transmission of the identification code associated with the secure element 130 and thus the user.

Figure 11A:
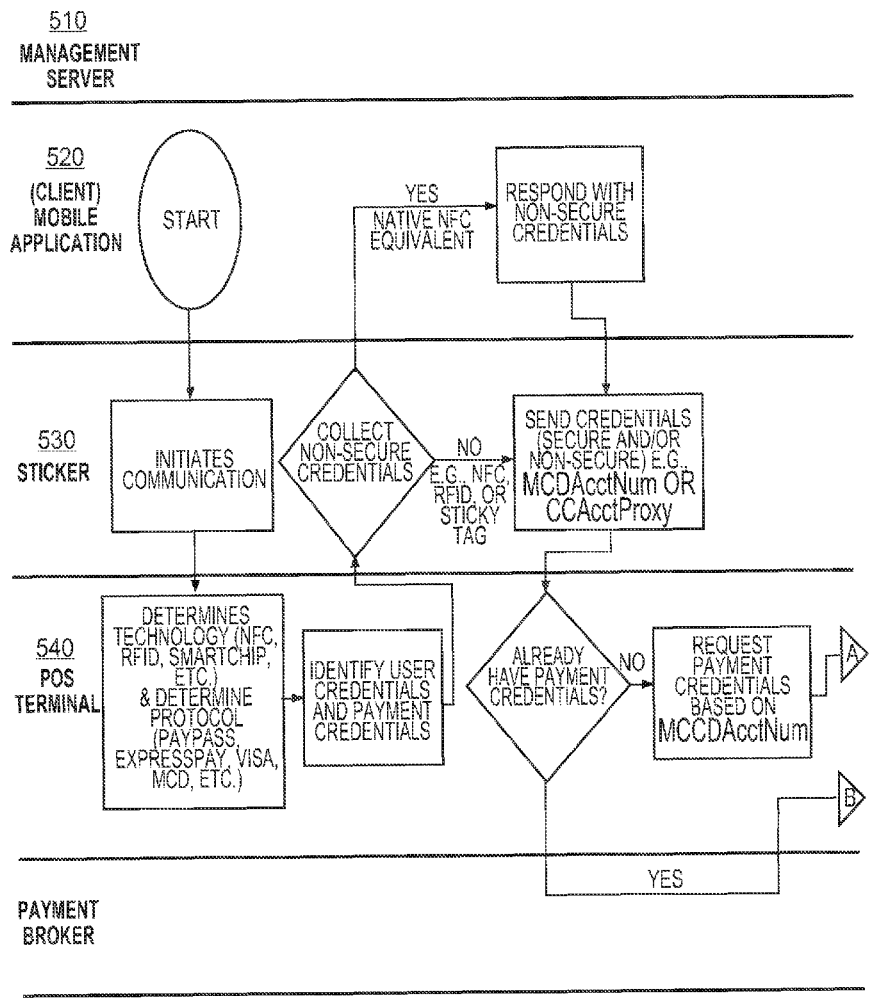
FIGS. 11A-11D illustrate a flowchart for conducting a transaction according to one implementation.
Figure 11B:
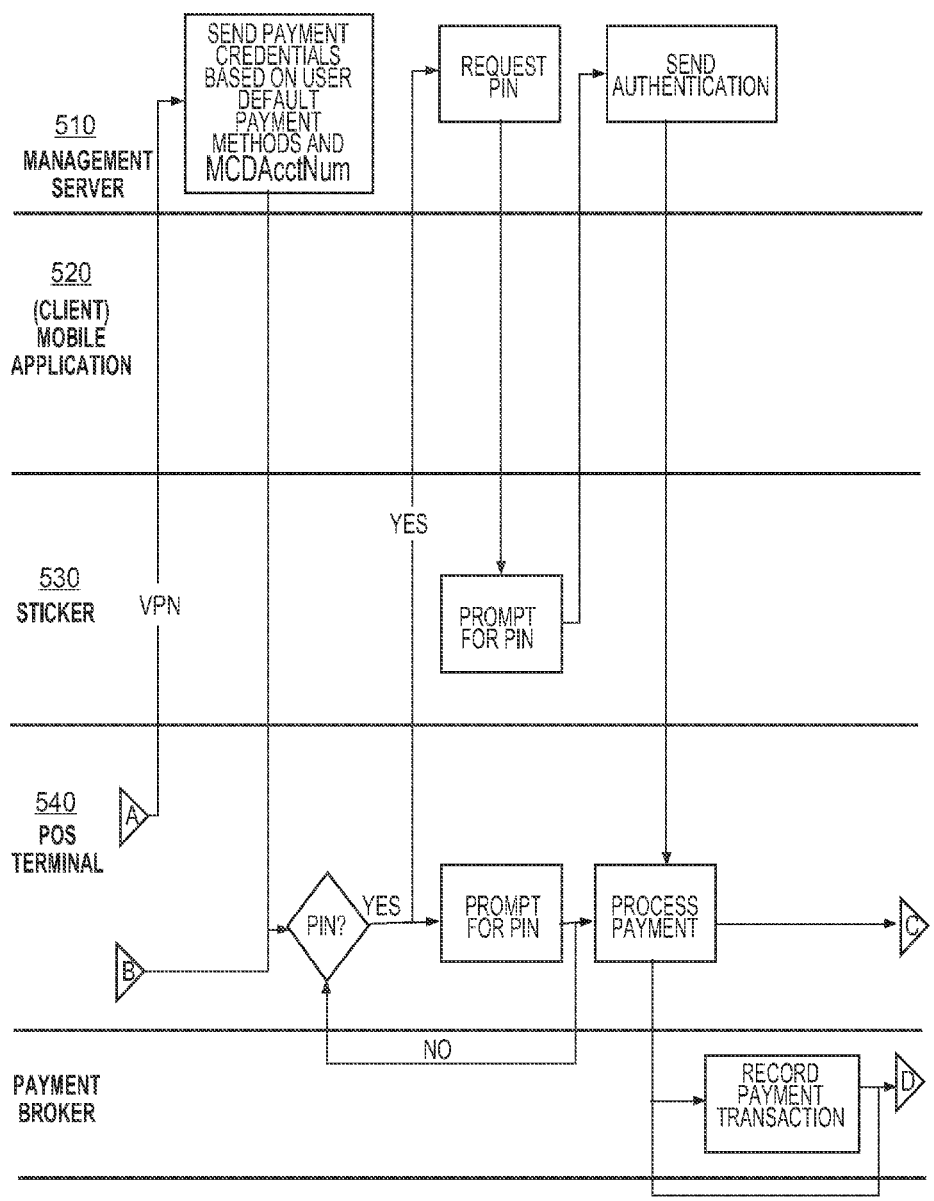

FIGS. 11A-11D illustrate a flowchart of a transaction in accordance with one implementation, and the various steps that are included in the transaction, with reference to which of the various devices are implementing this step. Referring to FIG. 11A, a user first waves a mobile communication device 530 (e.g., a NFC device or device having an attached sticker) across (or near) a POS terminal 540. The POS terminal 540 identifies the technology associated with the mobile communication device, a payment method, user credentials, and payment credentials. Irrespective if t mobile communication device is a NFC-Phone or includes an attached sticker, the mobile communication device sends to the POS Terminal 540 payment credentials including optional credentials (e.g., WalletID). As shown in FIG. 6B, using optional credentials (e.g., WalletID), contact is made with a transaction server 510 to request payment credentials. The POS terminal 540 determines if a security code prompt (e.g., a PIN) is needed? If yes, a prompt is made for the security code (PIN) on the POS terminal 540 and the process continues with processing of the payment. Otherwise, the POS terminal 540 simply proceeds with processing of the payment. As an alternative, the POS terminal 540 can integrate via the back office to a management server 510 and trigger a PIN prompt on the mobile communication device. In such a case, the user can enter the PIN on the mobile communication device (instead of through the POS terminal 540). The POS terminal 540 hands processing to a payment broker.

Figure 11C:
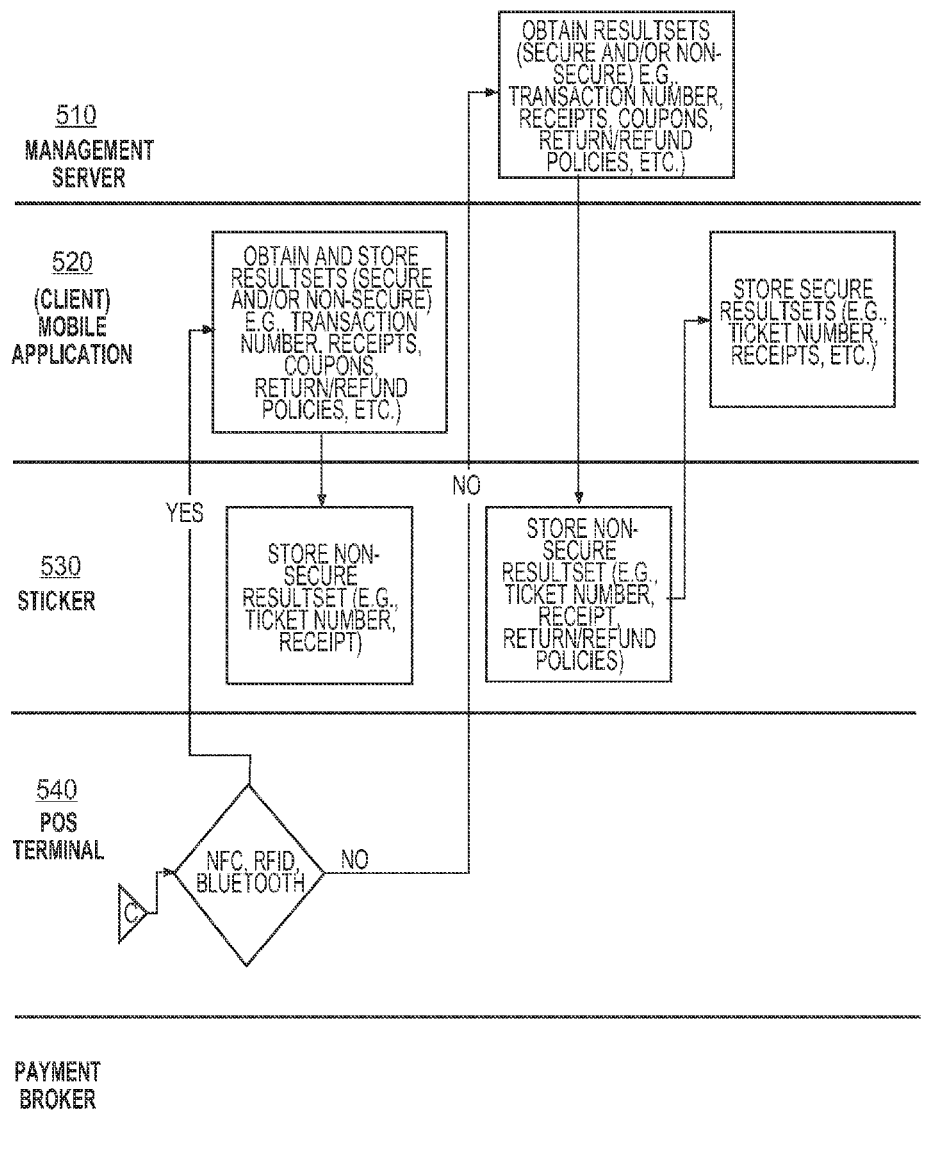
Figure 11D:
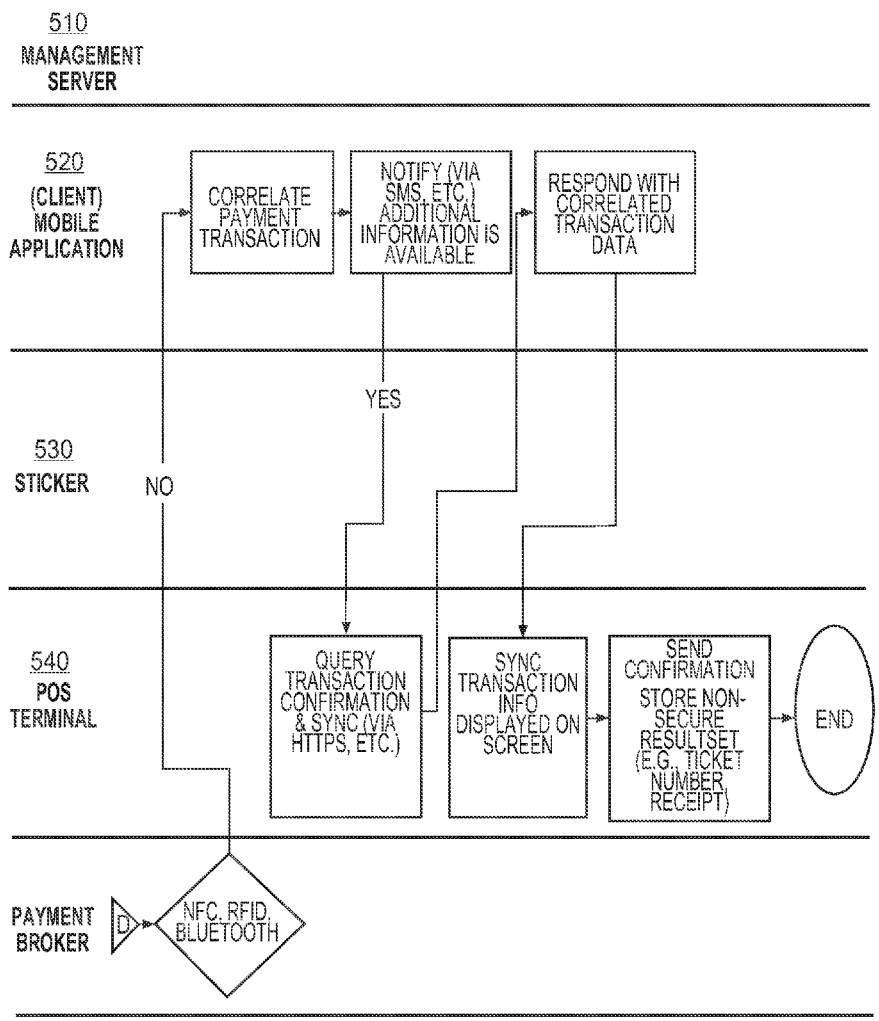

Referring to FIG. 11C, assuming the POS terminal 540 was capable of 2-way communication, if the POS terminal 540 determines that the mobile communication device is a NFC Phone, the POS terminal 540 can write digital artifacts (e.g., eReceipts, eTickets, eCoupons, etc.) to the mobile communication device. Non-secure data is stored in the mobile communication device. Otherwise, the POS terminal 540 sends optional digital artifacts to the management server 510. As part of an out-of-band sync between the management server 510 and the mobile communication device, the non-secure digital artifacts are downloaded and stored in the mobile communication device. Secure digital artifacts are downloaded to the mobile communication device and stored on a secure element of the mobile communication device (if possible).

The two transaction workflows that have been specifically discussed above are the credit card and ticketing workflows. Other transaction flows can also be implemented. Debit card and cash card transactions are similar to credit card transactions, with variations being implemented to account for the differences that exist in those types of transactions, which types of transactions are well understood. Coupons can be implemented with the invention, in much the same manner as tickets, though coupons can be transmitted without there being payment. Many of the transaction types noted herein will, as is apparent, require communication between the secure element 130 and the radio element 120. As such, due to that requirement, a significant part of the preceding discussion has been directed to how to implement that communication, particularly for mobile communication devices 110 that are not manufactured to allow for such communications.

An example of a typical transaction requiring such communication between the secure element 130 and the radio element 120 is one in which the POS terminal 150 allows for the transfer of detailed purchase information from the POS terminal 150 to the secure element 130, as well as transactional information from the POS terminal 150 and/or the transaction server 170 to the management server 180. The management server 180 can then also communicate with the radio element 120 via the radio channel. This allows for the matching and reconciliation of detailed purchase information and, if the transaction fails, failure details can be matched to the purchase information, and forwarded in real-time to the user via the radio element 120. In one implementation, there is included the provision for different phones to communicate the results of a transaction, particularly using the POS transceiver or one of the Bluetooth/Wifi transceivers. In this implementation, after a transaction has been completed with one of the mobile communication devices 110a, another mobile communication device 110b can receive information regarding the transaction completed. Thus, for instance, if mobile communication device 110a purchases two tickets, one of the tickets can be transmitted to the mobile communication device 110b by each using a POS transceiver or one of the Bluetooth/Wifi transceivers.

Figure 16:
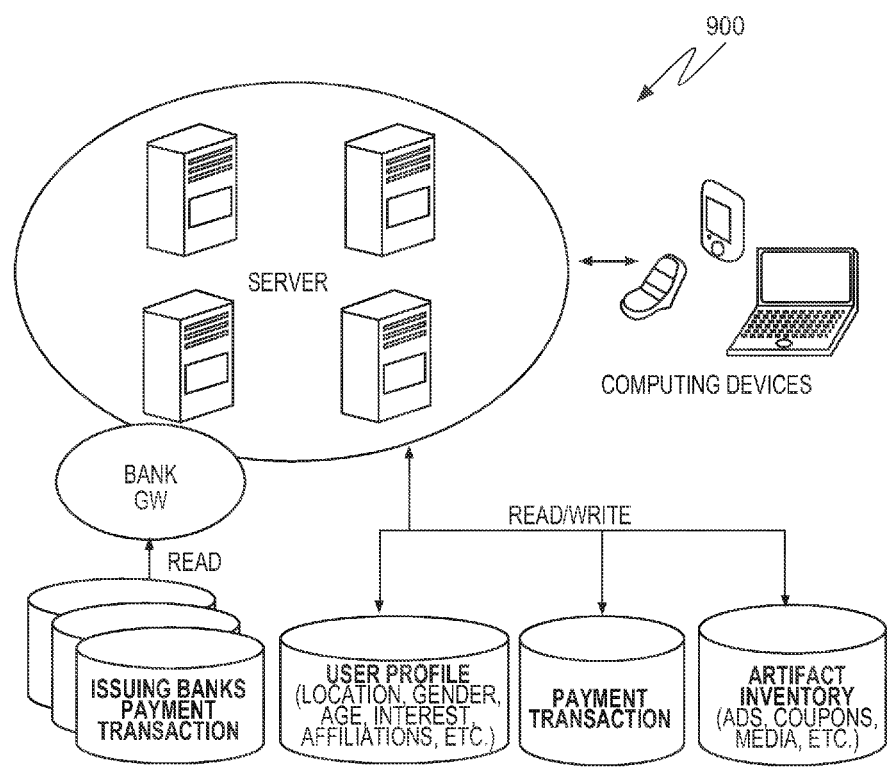
FIG. 16 illustrates a block diagram of a communication system including a wireless mobile communication device and a management server in accordance with one implementation.

FIG. 16 illustrates a block diagram of a communication system including a wireless mobile communication device and a management server in accordance with one implementation.

Figures 13, 14:
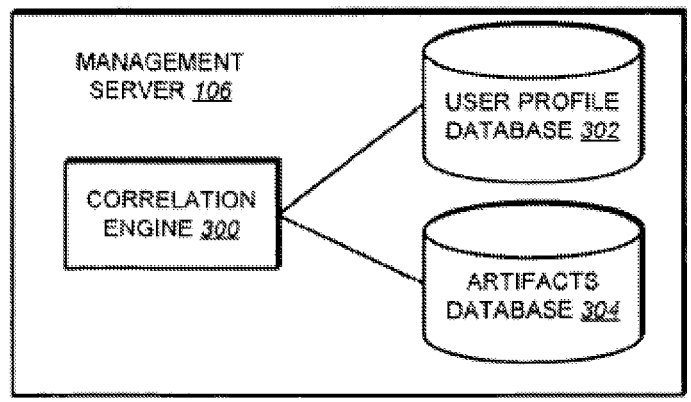
FIG. 13 illustrates one implementation of the management server.
FIG. 14 illustrates one example of the user profile database 302 including user profiles for USER 1 and USER 2

FIG. 13 illustrates one implementation of the management server 106. As shown in FIG. 13, the management server 106 includes a correlation engine 300, a user profile database 302, and an artifacts database 304. The correlation engine 300 can correlate user profile information (e.g., location, gender, age, interest, affiliations, etc.) stored in the user profile database 302 with other data (historical payment transactions, real-time payment transactions, etc.) stored in the artifacts database 304, and/or location of a user to provide more relevant targeting parameters for which to target, identify and distribute relevant artifacts to a user. In one implementation, the management server 106 is a server that is maintained by Mobile Candy Dish, Inc.

In one implementation, the user profile database 302 is continually updated with information pertaining to the user—e.g., location, payment history, transaction history, and the like. In addition, the artifacts database 304 can be continually updated with new artifacts that can be sent to users—e.g., users that are subscribed to, e.g., the Mobile Wallet application. For example, metadata can be associated to artifacts stored in the artifacts database 304. The metadata can be leveraged to trigger a secondary call-to-action, e.g., to encourage user behavior. For example, it may be desired for a user to enter an email address, accept coupon/rewards, opt-in for alerts and notification, etc. When an artifact is sent to a user, the metadata associated with the artifact can provide the additional dynamic next steps (e.g., through a user interface screen) to provoke the desired user action.

FIG. 14 illustrates one example of the user profile database 302 including user profiles for USER 1 and USER 2. As discussed above, in one implementation, the user profile database is continually updated based on transactions of a user. Accordingly, the user profile database 302 includes a plurality of targeting parameter fields—e.g., targeting parameter fields 1-4—that define targeting parameters that have been satisfied by (or apply to) a user. That is, USER 1 satisfies targeting parameters 1 and 4, while USER 2 satisfies targeting parameters 1, 2, and 4. In general, the user profile database 302 includes other fields (not shown) for storing other attributes associated with users—e.g., personal information. The artifacts database 304 can similarly include targeting parameters that correspond to each artifact. And in one implementation, the correlation engine 300 (FIG. 3) performs correlations between user-data targeting parameters and content targeting parameters in order to match relevant artifacts/content to a specific user profile based on various content distribution rules.

Figure 15:
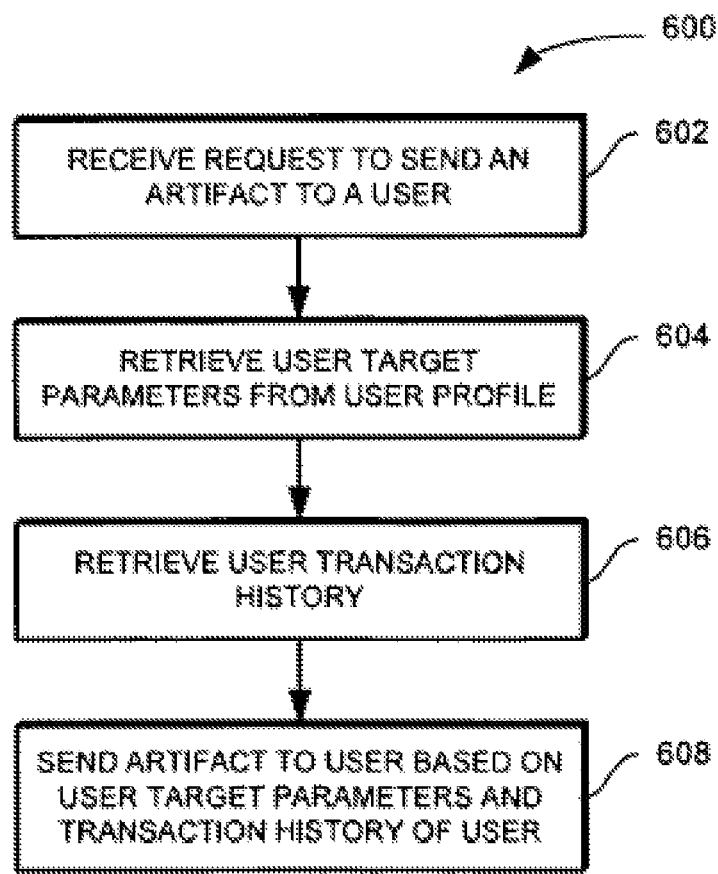
FIG. 15 illustrates one implementation of a method 600 for sending an artifact to a mobile communication device of a user.

FIG. 15 illustrates one implementation of a method 600 for sending an artifact to a mobile communication device of a user. A request to send an artifact to a user is received (e.g., by correlation engine 300) (step 306). The request can be a request generated from a user or be an automated request generated from a point-of-sale device, kiosk, or other device. In general, the artifact can be an advertisements, receipt, ticket, coupon, media, content, and so on. User target parameters from a user profile of the user are retrieved (e.g., by correlation engine 300) (step 604). A transaction history of the user is retrieved (e.g., by correlation engine 300) (step 606). An artifact is sent (from the management server) to the user based on the user target parameters and the transaction history of the user (step 608).

FIG. 16 illustrates one implementation of a communication system 900. The communication system 900 includes computing devices and a management server (designated "server"). The management server includes a correlation engine, a query manager, a user profile manager, and an inventory controller. The management controller is in communication with a user profile database, a payment transaction history database, and an artifact inventory database. The management server is also in communication with a bank so that raw data may be downloaded from banks and stored in local storage. In one implementation, data-mining and reporting tools are leveraged by the management server to define aggregated reports. Additionally, aggregated data may be downloaded from banks that provide/support data-mining and ad-hoc reporting tools.

In operation, a user opens an application (e.g, a web-browser) on a computing device (a mobile communication device). The application queries the management Server for an artifact, providing pageId (scene identifier) and userId, where the pageId can represent a specific screen, scene or real-estate property. The query can be initiated/triggered via following mechanisms, but not limited to: Browsing a particular screen/web-page that specify unique real-estate; leveraging proximity services (NFC/Contactless, etc.) that specify unique code or identifier; geographic location (LBS, Bluetooth, etc.). The management server collects targeting Meta Data based on the user's userId. The management server leverages multiple data sources including, but not limited to: user profiles (e.g., for location, gender, age, interest, affiliations, etc.); payment transactions (e.g., for top 5 spend categories, upcoming bill pay transactions, merchants, etc.). Leveraging payment transactions and banking transactions provides a good future trending of a user's behavior, including a level of importance/relevancy. Mining this data (for spend category, merchant, price level, etc.) provides a rich set of attributes that better describes a user's retail preference. The management server queries the artifact inventory against query parameters based on targeting meta data. If multiple matches are determine, the correlation engine uses predetermined business rules and identifies and returns a URL (Universal Resource Locator) to a unique artifact. The user (or consumer) can use the application running on the mobile communication device to retrieve artifact/content based on the provided URL.

In general, while effort is made to minimize storage of sensitive user information and data in a memory of a mobile communication device, in one implementation, some data is stored in the memory of a mobile communication device due to reasons of performance, usability and user experience. For example, data may need to be stored on a mobile communication device in the following circumstances. Payment credentials, coupons, tickets, and so on may have to be stored on the secure element of an NFC phone. Account balance, banking payment history, etc., may be locally cached on a mobile communication device. In one implementation, a user can opt-in to save payment method security codes in the client (or mobile application) for convenience. Tickets and/or coupons may be locally cached so that a user can redeem the tickets and/or coupons in an offline mode. For example, a mobile communication device may be offline in a situation in which network connectivity inside a building is degraded, and storing a ticket and/or coupon in a local cache of the mobile communication device permits the user to access the ticket or coupon.

In one implementation, while a client is open, a user has access to transaction data. In such an implementation, users who may misplace a mobile communication device while the client is open may expose the user to risk of information theft. Therefore, in one implementation, mobile application (or client) shuts down after a period of inactivity. Additional tasks that can be associated with the shutdown procedure can include, but is not limited to, temporarily shutting down a secure element (of the mobile communication device) to prevent NFC payments, NFC coupon redemption, and NFC ticket redemption.

Rewards/Loyalty/Coupons

A user can keep track of reward/loyalty cards—e.g., frequently flyer account number, rental car reward membership, hotel reward membership, and the like—through the rewards module. In one implementation, a user can view, in real-time, a summary of all rewards (e.g., points accumulated) directly on a cellular phone. A user can also search for and store coupons on their mobile communication device for use during, e.g., a contactless purchase.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

While the foregoing has been with reference to a particular embodiment of the invention, it will be appreciated by those skilled in the art that changes in this embodiment may be made without departing from the principles and spirit of the disclosure, the scope of which is defined by the appended claims.

What is claimed is:

1. A method comprising:

triggering, by a point-of-sale terminal, execution of a secure element application operating at an application layer of a secure element in response to a near field communication initiated by the point-of-sale terminal without communication between the secure element and a mobile device, the execution of the secure element application by a secure element processor included in the secure element sends a coupon and payment credentials to the point-of-sale terminal without prior authentication;

receiving, at the point-of-sale terminal comprising a point-of-sale terminal processor, the coupon and payment credentials corresponding to a default payment mechanism associated with the secure element, wherein the secure element is coupled to the mobile device comprising a mobile device memory, a mobile device processor that executes a mobile application, and a mobile device transceiver; and sending, by the point-of-sale terminal, the coupon and payment credentials to a management server, wherein the management server processes a near field communication transaction using the payment credentials and the coupon.

2. The method of claim 1, wherein a digital artifact is delivered from the management server to the mobile device through the mobile device transceiver, wherein the digital artifact includes metadata operable to trigger a call-to-action.

3. The method of claim 2, wherein the digital artifact comprises an advertisement, receipt, ticket, media, metadata and/or content.

4. The method of claim 2, wherein the call-to-action is a user prompt to enter an email address, accept a coupon/reward, and/or opt-in for alerts and notifications.

5. The method of claim 2, wherein the digital artifact is sent to the mobile device based on targeting parameters associated with personal information and transaction history stored at the management server.

6. The method of claim 5, wherein personal information includes user location, gender, age, interest, and/or affiliations and wherein transaction history comprises historical payment transactions, real-time payment transactions, banking transactions, bill pay, merchants, price-level, spend categories, transactions conducted through the mobile device, and/or transactions downloaded from banks.

7. The method of claim 2, wherein the digital artifact is sent to the mobile device when a user of the mobile device browses a particular screen of the mobile device application that specifies unique real-estate, uses proximity services such as near field communications that specify a unique code, or accesses location-based services.

8. The method of claim 1, wherein a shopping list is transmitted from the mobile device to the point-of-sale terminal prior to initiating the near field communication interaction.

9. The method of claim 2, wherein the digital artifact is sent to the mobile device based on movement of the mobile device into close proximity of a smart poster, a radio frequency identification (RFID) device, a Bluetooth device, or a location-based service device.

10. The method of claim 2, wherein the digital artifact is received through a near field communication transceiver at the secure element after purchase from the point-of-sale terminal, wherein the digital artifact comprises a receipt, coupon, ticket, and/or return/refund policy.

11. The method of claim 1, wherein transaction data is transmitted from the mobile device to another mobile device using near field communications, Bluetooth, and/or wireless fidelity (WiFi).

12. The method of claim 1, wherein the secure element is physically coupled to the mobile device but electrically decoupled from the mobile device.

13. The method of claim 12, wherein the secure element is included in a housing associated with the mobile device.

14. The method of claim 1, wherein a security tool is implemented at the mobile device application, the security tool configured to prompt a user to login to the mobile device, use biometrics to authenticate the user before authorizing a transaction, prompt the user to enter a payment limit PIN in response to a pending purchase exceeding a pre-determined amount, temporarily disable the secure element, permanently disable the secure element, delete all cached data stored in mobile device memory, and/or store encrypted security codes on the mobile device, wherein disabling the secure element prevents near field communication payments, coupon redemption and ticket redemption.

15. The method of claim 2, wherein a status of the digital artifact is received at the mobile device, wherein the status is one of assigned, saved, redeemed or deleted.

16. The method of claim 1, wherein data is exchanged between the secure element processor and the mobile device processor.

17. The method of claim 1, wherein the secure element comprises a payment application, a ticketing application, an identity application and/or a coupon application.

18. A point-of-sale terminal comprising:
a point-of-sale interface configured to receive a coupon and payment credentials corresponding to a default payment mechanism associated with a secure element, the secure element is coupled to a mobile device comprising a mobile device memory, a mobile device processor that executes a mobile application, and a mobile device transceiver, wherein a secure element processor included in the secure element initiates execution of a secure element application operating at an application layer of the secure element in response to a near field communication triggered by the point-of-sale without communication with the mobile device and sends the payment credentials and coupon to the point-of-sale terminal without prior authentication; and
a point-of-sale processor configured to send the coupon and payment credentials to a management server, wherein the management server processes a near field communication transaction using the payment credentials and the coupon.

19. The point-of-sale terminal of claim 18, wherein a digital artifact is delivered from the management server to the mobile device through the mobile device transceiver, wherein the digital artifact includes metadata operable to trigger a call-to-action.

20. The point-of-sale terminal of claim 19, wherein the digital artifact comprises an advertisement, receipt, ticket, media, metadata and/or content.

* * * * *